2,856,289

STABILIZERS FOR ICE CREAM AND THE LIKE

Bernard Weinstein, Ashton, Ill., assignor, by mesne assignments, to Crest Foods Co., Inc., Ashton, Ill., a corporation of Illinois No Drawing. Application February 9, 1955
Serial No. 487,204

5 Claims. (Cl. 99—136)

Commercial manufacturers of ice cream type desserts (including ice milk) generally incorporate in their product some form of stabilizer. These stabilizers function to help provide or maintain the proper smoothness and other desirable characteristics of the dessert, especially by minimizing undesired separation of the constituents which could result, for example, in the growth of ice crystals. There has been a constant search for better stabilizers.

According to the present invention, a superior stabilizer is provided through the combination of a guar seed or locust bean gum with a protein-stabilizing salt substance including sodium hexametaphosphate and preferably also including sodium citrate. This protein stabilizer is especially beneficial if the gum used is largely guar seed gum or locust bean gum, because it overcomes some disadvantages of those gums which have partially offset recognized desirable qualities.

Among the formulas which might be used for the stabilizer are the following:

*Formula #1*

|  | Pounds |
|---|---|
| Guar seed gum | 84 |
| Irish moss extract | 10 |
| Sodium citrate | 3½ |
| Sodium hexametaphosphate | 2½ |

*Formula #2*

| Guar seed gum | 90 |
|---|---|
| Irish moss extract | 5 |
| Sodium citrate | 4 |
| Sodium hexametaphosphate | 1 |

*Formula #3*

| Guar seed gum | 80 |
|---|---|
| Irish moss extract | 12 |
| Sodium citrate | 5 |
| Sodium hexametaphosphate | 5 |

*Formula #4*

| Guar seed gum | 42 |
|---|---|
| Carboxymethylcellulose | 39 |
| Irish moss extract | 10 |
| Sodium citrate | 5 |
| Sodium hexametaphosphate | 4 |

*Formula #5*

| Guar seed gum | 18 |
|---|---|
| Carboxymethylcellulose | 51 |
| Irish moss extract | 16 |
| Sodium citrate | 10 |
| Sodium hexametaphosphate | 5 |

*Formula #6*

| Guar seed gum | 94 |
|---|---|
| Sodium citrate | 4 |
| Sodium hexametaphosphate | 2 |

The amount of each of the above formulas used in an ice cream mix would depend upon the nature of the mix. With a mix having a total solids content of 37% to 39%, typical usage of any of the foregoing might lie within the range of .08 to .15 percent. If the gum is locust bean gum, the higher ranges are more likely to be desired. All percentages are by weight. As sold, stabilizers might include some additional elements, such as dextrose, in which case a correspondingly larger quantity of the diluted stabilizer would be used.

Certain gums, including guar seed gum, Irish moss extract, and locust bean gum, though having a high ability to take up water and stabilize a product like ice cream, have a detracting characteristic of causing a denaturing of proteins so that the inherent stabilizing effect of the proteins is impaired, thereby offsetting some of the stabilizing effect of the gum.

The combination of sodium citrate and sodium hexametaphosphate has an exceptionally high value in countering this tendency of these gums. For this purpose, it is preferred that the proportion of sodium hexametaphosphate to sodium citrate be within the range of from 1 to 4 to 2 to 1. It is also preferred that the protein-stabilizing salt substance comprise from 5% to 10% of the stabilizer. Thus it will comprise less than $\frac{2}{100}$ of 1% of the total ice cream mix.

With some loss of the exceptional degree of satisfaction resulting from the use of sodium citrate, as above, it may be replaced with sodium phosphate or potassium phosphate, either monobasic, dibasic or tribasic, the monobasic being preferred. The monobasic substances are preferred because for a given weight they provide more negative ions to neutralize and stabilize the proteins. Sodium citrate is preferable to the other trivalent alternative substances. It is organic, the citrate ions are more stable, and more readily available. The sodium hexametaphosphate can be present as a portion of various complex polyphosphates.

Other protein-stabilizing salts can be used. Sodium sulfate is one of the better of these less-preferred salts. The sodium hexametaphosphate should still comprise at least one-fifth of the total protein-stabilizing salt substance.

The combination of sodium hexametaphosphate and sodium citrate appears to be a superior protein stabilizer in general and has been found superior for use with other gums, such as sodium carboxymethylcellulose as the main gum, preferably with a little Irish moss extract.

The Irish moss extract is commonly used in stabilizers because of its exceptional gelling properties.

I claim:

1. A stabilizer for ice cream type dessert comprising sodium hexametaphosphate, gum selected from the group consisting of guar seed and locust bean gum, and a basic salt selected from the group consisting of citrates of sodium, citrates of potassium, phosphates of sodium, and phosphates of potassium.

2. A stabilizer according to claim 1 wherein said basic salt is present in the proportion of from one-half to four times the weight of sodium hexametaphosphate, and wherein the total weight of the basic salt and the sodium hexametaphosphate is in the range of from 5% to 10% by weight of the total of said stabilizer.

3. A stabilizer according to claim 2 wherein said gum is largely guar seed gum.

4. A stabilizer according to claim 2 wherein said gum is largely locust bean gum.

5. A stabilizer according to claim 2 wherein said stabilizer is largely guar seed gum and said basic salt is sodium citrate.

References Cited in the file of this patent

UNITED STATES PATENTS

| 2,007,218 | Seltzer | July 9, 1935 |
|---|---|---|
| 2,267,911 | Grettie | Dec. 30, 1941 |
| 2,279,205 | Parsons et al. | Apr. 7, 1942 |
| 2,502,397 | Werbin | Mar. 28, 1950 |